United States Patent
Chen

(10) Patent No.: US 8,430,381 B2
(45) Date of Patent: Apr. 30, 2013

(54) APPARATUS WITH PROTECTION MECHANISM

(75) Inventor: Chao-Jen Chen, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 862 days.

(21) Appl. No.: 12/492,136

(22) Filed: Jun. 25, 2009

(65) Prior Publication Data

US 2009/0321199 A1    Dec. 31, 2009

(30) Foreign Application Priority Data

Jun. 26, 2008    (CN) .......................... 2008 1 0302337

(51) Int. Cl.
*F16M 1/00*    (2006.01)

(52) U.S. Cl.
USPC .......................................................... 267/140

(58) Field of Classification Search .................. 267/139, 267/140, 153, 292, 141, 136, 152, 182; 73/200
See application file for complete search history.

(56) References Cited

U.S. PATENT DOCUMENTS

| | | | | |
|---|---|---|---|---|
| 2,596,780 | A | * | 5/1952 | Meyers et al. ................. 267/140 |
| 4,310,947 | A | * | 1/1982 | Salerno .............................. 16/83 |
| 6,158,726 | A | * | 12/2000 | Coleman et al. .............. 267/292 |
| 7,059,182 | B1 | * | 6/2006 | Ragner ............................ 73/200 |

FOREIGN PATENT DOCUMENTS

DE    2915954 A   * 10/1980

* cited by examiner

*Primary Examiner* — Melanie Torres Williams
(74) *Attorney, Agent, or Firm* — Altis Law Group, Inc.

(57) ABSTRACT

An apparatus includes a main body and a protection mechanism disposed on the main body. The protection mechanism includes a connecting member inserted in the main body and including a post; and a damping member attached on the connecting member away from the main body. The damping member bears an initial impact, before the main body, when the apparatus collides.

7 Claims, 2 Drawing Sheets

APPARATUS WITH PROTECTION MECHANISM

BACKGROUND

1. Technical Field

The present disclosure relates to protection mechanisms, and more particularly to a protection mechanism for protecting an apparatus during collision.

2. Description of Related Art

An apparatus, especially a fragile apparatus, may be easily damaged, when in collision with other objects. Thus, the apparatus must be replaced or repaired, this is inconvenient and expensive.

Therefore, a need exits for providing a protection mechanism for the apparatus capable of protecting the apparatus from damage.

DETAILED DESCRIPTION

Figure 1:
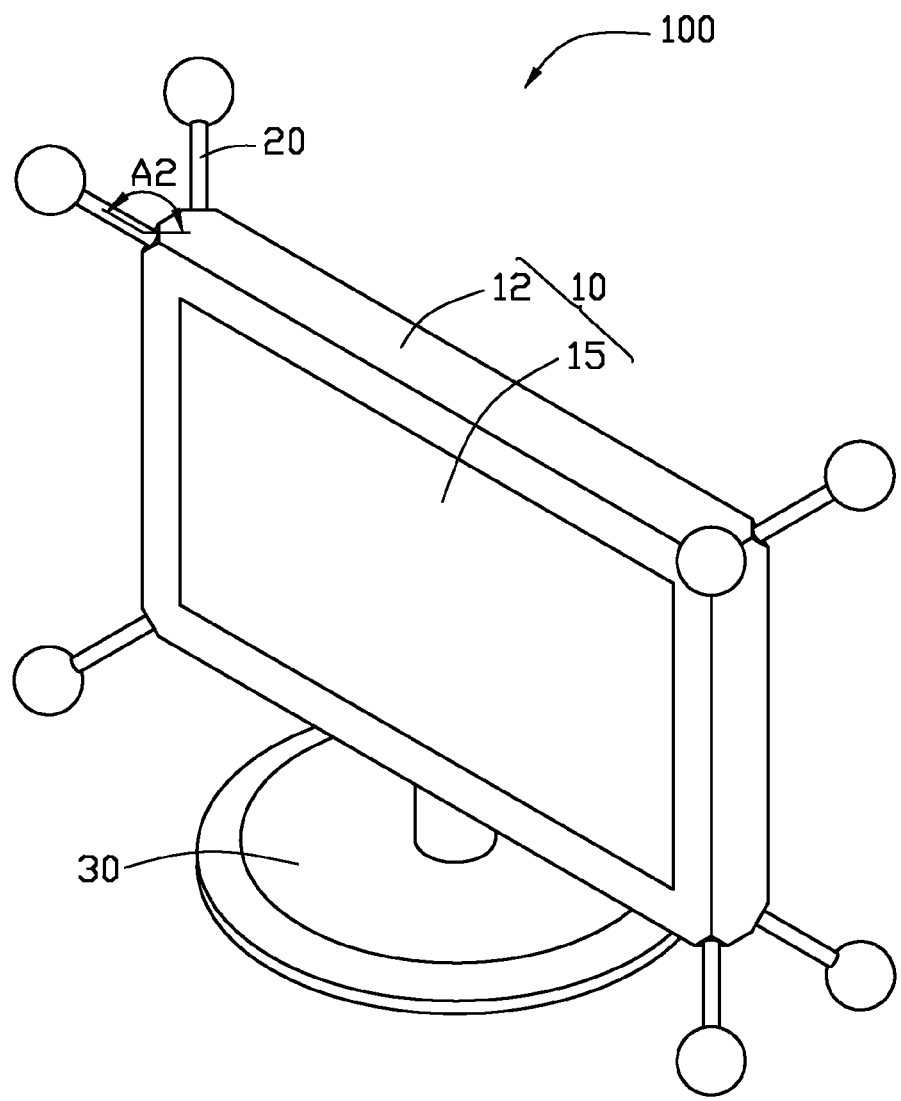
FIG. 1 is an isometric view of a display device in accordance with an exemplary embodiment.
Figure 2:
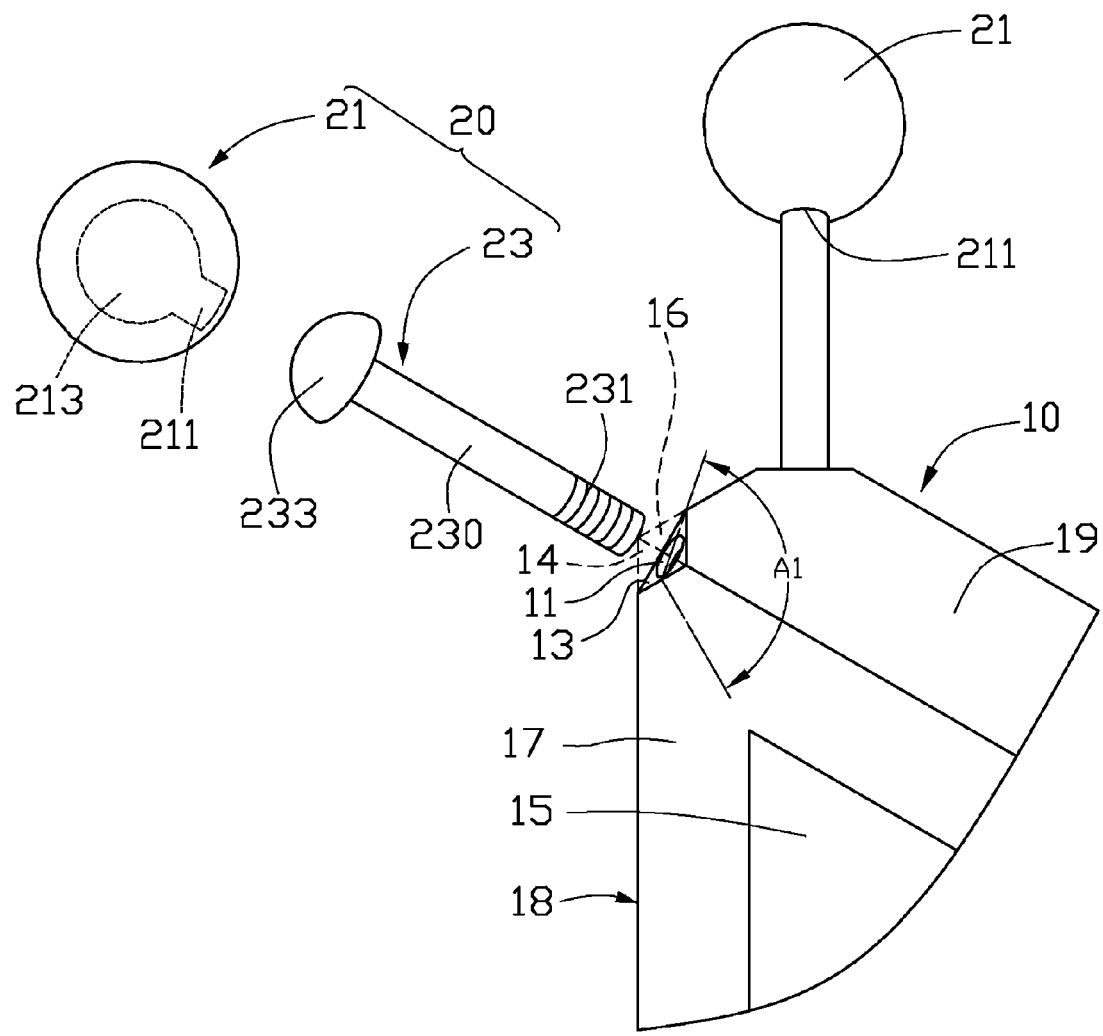
FIG. 2 is a partial exploded, isometric view of the display device of FIG. 1.

Referring to FIGS. 1 and 2, an apparatus with a protection mechanism in accordance with an exemplary embodiment is illustrated. The apparatus may be any device, especially which is easily damaged when falling to the ground. In this embodiment, the apparatus is a display device 100.

The display device 100 includes a main body 10, and one or more protection mechanisms 20 disposed on the main body 10, and a stand 30 supporting the main body 10.

The main body 10 includes a substantially rectangular frame 12 and a liquid crystal panel 15 mounted in the frame 12. The frame 12 has six exterior surfaces, i.e. a front surface 17, a left side surface 18, a top surface 19, a right side surface (not labeled), a rear surface (not labeled), and a bottom surface (not labeled). The frame 12 further includes eight corners 16, each corner 16 is defined by three exterior surfaces of the frame 12 which connect with each other. For example, a corner 16 shown in FIG. 2 is defined by the front surface 17, the left side surface 18, and the top surface 19.

The corners 16 of the frame 12 are cut to form triangular cutting surfaces 13 and cut portions 14. Each of the cutting surfaces 13 is inclined. A first angle A1 between the cutting surface 13 and each corresponding exterior surface, such as the front surface 17, the left side surface 18, and the top surface 19 which connect with the cutting surface 13 is 135 degrees. The main body 10 further defines a fixing threaded hole 11 in each cutting surface 13.

The protection mechanisms 20 are disposed at the cut portions 14 correspondingly. In the embodiment, the number of the protection mechanisms 20 is eight, and the eight mechanisms 20 are fixed at eight corners of the frame 12 correspondingly. Each of the protection mechanisms 20 includes a damping member 21 and a connecting member 23.

The damping member 21 may be a sphere, and further defines an internal receiving portion 213 and an opening 211. The opening 211 communicates with the receiving portion 213. The damping member 21 is deformable while pressed, and recoverable while no longer pressed. The damping member 21 is made of elastomeric material. In the exemplary embodiment, the damping member 21 is made of rubber.

The connecting member 23 includes a post 230, a threaded portion 231 and a head portion 233. The threaded portion 231 and the head portion 233 are located at opposite ends of the post 230. The threaded end 231 is engageably installed in the fixing threaded hole 13 of the main body 10. The connecting member 23 is perpendicular to the cutting surface 13. A second angle A2 between the connecting member 23 and each corresponding exterior surface, such as the front surface 17, the left side surface 18, and the top surface 19 which connect with the cutting surface 13 is larger than 0 degrees and smaller than 180 degrees. The second angle A2 is ideally 135 degrees.

The head portion 233 may be a half-ball. A diameter of the head portion 233 is larger than that of the post 230 and the opening 211. Therefore, the head portion 233 can deform and insert into the receiving portion 213 of the damping member 21 through the opening 211.

When the display device 100 collides, the damping member 21 may bear the initial/first impact before the main body 10, and the connecting member 23 may support the main body 10, so that a direct collision with the main body 10 is avoided. Furthermore, the damping member 21 is deformable, so that an impact force produced by the collision is reduced, and absorbed by the damping member 21, so as to protect the liquid crystal panel 15 from damage.

It is to be understood, however, that even though numerous characteristics and advantages of the present disclosure have been set forth in the foregoing description, together with details of the structure and function of the present disclosure, the present disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. An apparatus comprising:
   a main body; and
   a protection mechanism disposed on the main body; the protection mechanism comprising:
   a connecting member inserted in the main body, the connecting member comprising a post; and
   a damping member attached on the connecting member away from the main body;
   wherein the damping member bears an initial impact before the main body when the apparatus collides, the connecting member is fixed at the corner defined by three exterior surfaces of the main body; the main body is cut to form a cutting surface at the corner, the cutting surface is obliquely connected with the corresponding three exterior surfaces of the main body, the connecting member is perpendicular with the cutting surface, and an angle between the post and each of the three exterior surfaces is 135 degrees.

2. The apparatus as claimed in claim 1, wherein the main body is rectangular-shaped; and an angle between the cutting surface and each of the three exterior surfaces is 135 degrees.

3. The apparatus as claimed in claim 1, wherein the main body defines a threaded hole in the cutting surface; and the connecting member includes a threaded portion engageably installed in the threaded hole.

4. The apparatus as claimed in claim 3, wherein the connecting member further includes a head portion and a post connecting the head portion with the threaded portion.

5. The apparatus as claimed in claim 4, wherein the damping member defines a receiving portion and an opening communicating with the receiving portion, the head portion is inserted into the receiving portion through the opening.

6. The apparatus as claimed in claim 5, wherein a diameter of the head portion is larger than that of the post and the opening.

7. The apparatus as claimed in claim 1, wherein the main body is cut to form a cut portion at the corner; and the connecting member is fixed in the cut portion.

* * * * *